United States Patent [19]

Ericson et al.

[11] Patent Number: 5,201,821
[45] Date of Patent: Apr. 13, 1993

[54] DISC BRAKE ELEVATOR DRIVE SHEAVE

[75] Inventors: Richard J. Ericson, Southington; Michael Lang, Middletown, both of Conn.

[73] Assignee: Otis Elevator Company, Farmington, Conn.

[21] Appl. No.: 818,316

[22] Filed: Jan. 8, 1992

[51] Int. Cl.⁵ .................................... B66B 11/04
[52] U.S. Cl. ........................... 187/20; 188/188
[58] Field of Search ............ 187/89, 20; 188/171, 188/188, 189; 254/375

[56] References Cited

U.S. PATENT DOCUMENTS

| | | | |
|---|---|---|---|
| 4,688,660 | 8/1987 | Kaneko | 187/20 |
| 4,960,186 | 10/1990 | Honda | 187/20 |
| 4,977,982 | 12/1990 | Bialy et al. | 187/89 |
| 5,007,505 | 4/1991 | Lindegger | 187/89 |

FOREIGN PATENT DOCUMENTS

| | | | |
|---|---|---|---|
| 542815 | 12/1955 | France | 254/375 |
| 236189 | 9/1989 | Japan | 187/20 |

*Primary Examiner*—Robert P. Olszewski
*Assistant Examiner*—Kenneth Noland
*Attorney, Agent, or Firm*—William W. Jones

[57] ABSTRACT

Movement of an elevator cab drive sheave is controlled by a multiple disc brake assembly which is operably connected to the output shaft and sheave of the elevator drive machine. The disc brake assembly can act as an upward or downward safety brake, and can also serve as the operating brake for normal operation of the elevator. The brake assembly can be fitted onto a substantially conventional existing elevator system, and its operation is not affected by any gear degradation in the machine drive gears.

6 Claims, 3 Drawing Sheets

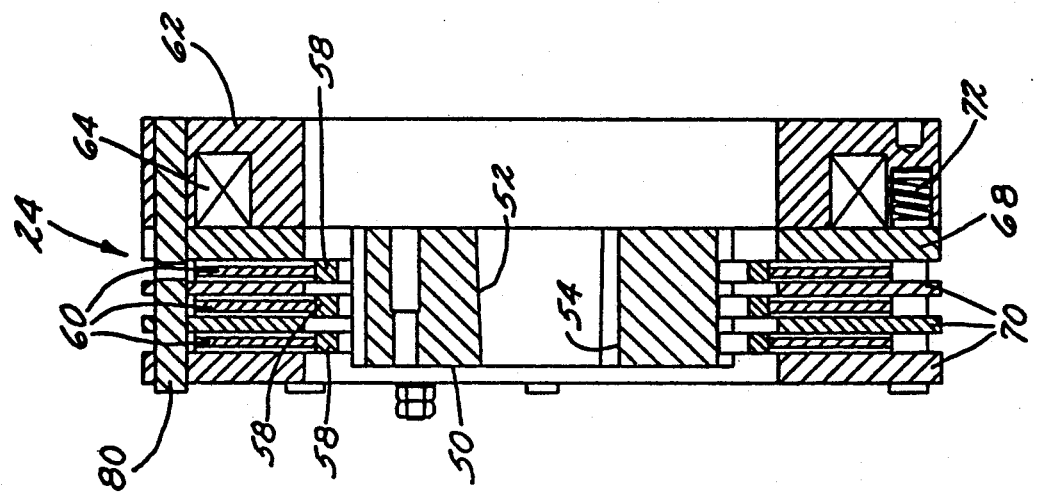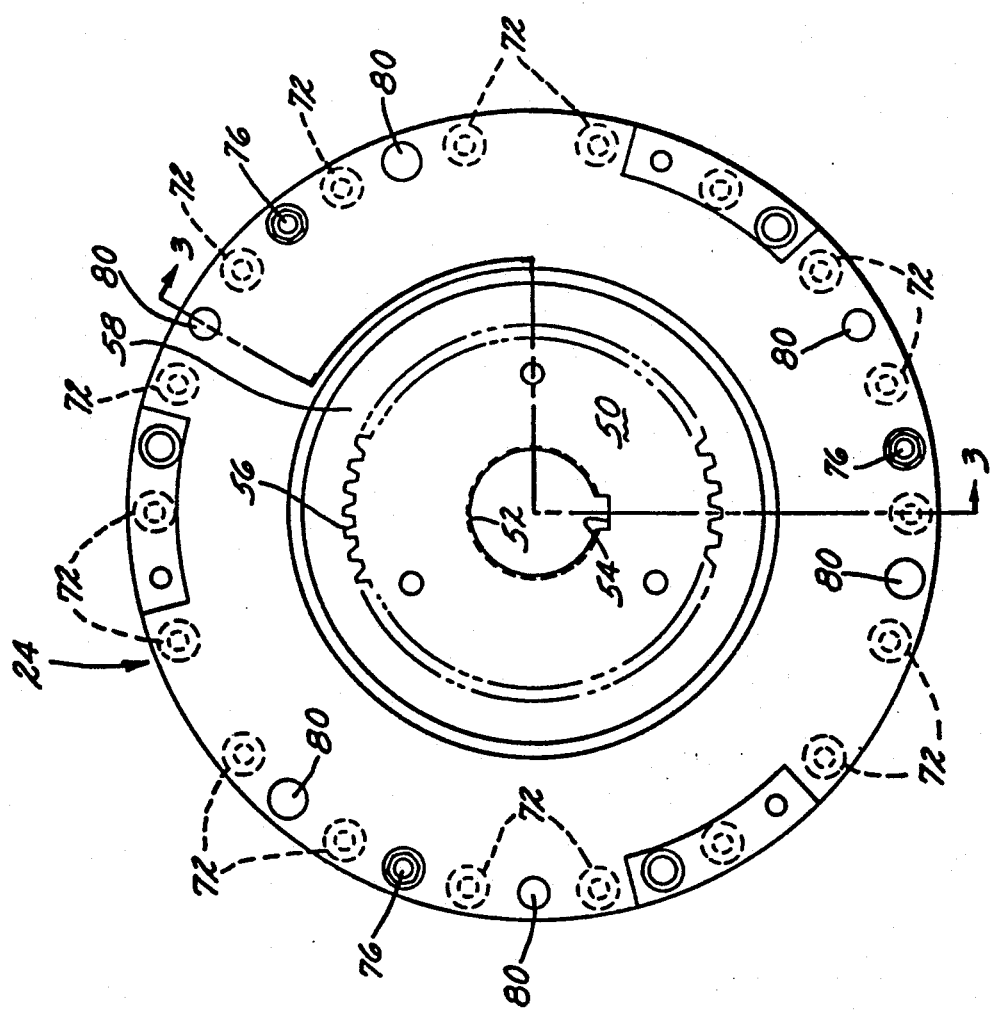

DISC BRAKE ELEVATOR DRIVE SHEAVE

This invention is related to the subject matter of co-pending U.S. Ser. No. 07/801,304 filed Dec. 2, 1991.

TECHNICAL FIELD

This invention relates to a brake assembly for an elevator drive sheave, and more particularly to a disc brake assembly which provides both up and down emergency brake utility, as well as normal operating brake utility.

BACKGROUND ART

Elevators are presently provided with a plurality of braking devices which are designed for use in normal operation of the elevator, as for example to hold the cab in place when it stops at a landing; and which are designed for use in emergency situations such as stopping the cab and/or counterweight from plunging into the hoistway pit.

The normal operational brakes on one elevator are typically drum brakes which engage the machine output shaft to hold the latter against rotation when the cab is stopped at a floor. The emergency brakes are typically brakes mounted on the cab frame or counterweight assembly which are tripped by sensed overspeed of a governor cable connected to the cab or counterweight. Once the emergency brakes are tripped, they will typically grab the guide rails in the hoistway to stop the cab or counterweight. The normal operating brakes described above cannot be used in emergency situations, and the emergency brakes described above are not operated in an instance where the cab is moving out of control in the upward direction in the hoistway.

Concerns as to passenger safety in a cab moving out of control in the upward direction in a hoistway have prompted safety code revisions in North America which mandate that elevator systems include provisions for safely stopping a runaway cab in the upward direction. These revisions have prompted research and investigation into braking systems which can provide the required function U.S. Pat. No. 4,977,982 granted Dec. 18, 1990 to L. Bialy, et al., discloses an elevator sheave brake safety which acts directly on the drive sheave to jam the latter in the case of uncontrolled upward movement of the elevator cab, whereby the cab is stopped in the hoistway. The brake safety can also stop movement of the cab away from a landing in the event that the cab doors are open. Both of these features are desirable safety features. The brake safety disclosed in this patent utilizes a pair of wedge blocks which flank the sheave and are spring-biased toward the sheave. When the safety is tripped by undesirable cab movement, the wedges will move against and jam the sheave so that it stops rotating, thereby stopping the cab. The wedging can stop the cab in both the up and down directions. U.S. Pat. No. 5,007,505 granted Apr. 16, 1991 to R. Lindegger discloses an elevator traction sheave brake which includes a vertically reciprocating spring-biased friction plate beneath the sheave. The friction plate is normally held away from the sheave, but during undesirable cab movement, will move upwardly to jam rotational movement of the sheave. As before, this brake can stop upward or downward movement of the cab.

Both of the aforesaid brake assemblies operate directly on the drive sheave or a part attached thereto to jam the sheave at its circumference, and can thus damage the sheave or can create a wedged engagement with the sheave that is very difficult to release. Each of these brakes also results in minimal surface contact between the sheave and the brakes whereby forces exerted on the sheave are quite concentrated, and whereby the cab will be jolted to a stop when the brakes trip.

There are several problems relating to the prior art elevator up safety brakes which remain to be solved. One problem relates the desirability of providing maximum area contact between the brake and the drive so as to be able to provide high braking torque to the drive. The ability of the brake to be readily released, and to be able to be reused without refurbishing, and to operate with a relatively low power supply are also highly desirable. Another advantage would be to be able to utilize the emergency brake as the normal operating brake which holds the cab in place when stopped at landings.

DISCLOSURE OF THE INVENTION

This invention relates to a multi-disc disc brake assembly which can be incorporated into new elevator equipment. The brake assembly is operably mounted on the machine drive shaft. The rotating discs in the brake assembly are mounted on a tapered extension of the output shaft for rotation therewith. The stationary portion of the brake assembly is operably connected to the machine casing.

The brake assembly is electromagnetically operated and its actuation is controlled by the conventional governor rope cab speed detector assembly, and by the cab door sensors and cab movement sensors. The brake assembly thus can be tripped in a cab overspeed (up or down) situation, and also when the cab moves away from a landing with its doors open. The geometry of the brake assembly allows the use of large brake discs, i.e., fifteen to twenty inch diameter discs, for example, which provide a large magnetic path so that high braking torque can be developed at low operating power. The large magnetic path reduces or eliminates magnetic saturation in the non-rotating metal brake plates which in turn allows a relatively large brake-actuating spring force to be used in the brake. By way of example, the brake of this invention can develop 1,680 to 2,800 ft. lbs. of torque (15" disc) or 3,800 to 6,000 ft. lbs. of torque (20° disc) using less than one amp of current. By coupling the brake assembly with the output shaft, the condition of the gears (worm gear and ring gear) in a geared machine has no effect on the operability of the brake. Thus, were the gears to break causing machine failure and a runaway sheave, the brake would still set and be able to stop the sheave.

It is therefore an object of this invention to provide a safety brake assembly for an elevator system which is capable of stopping an elevator cab moving in an unsafe manner upwardly in the hoistway.

It is a further object of this invention to provide a brake assembly of the character described which acts on the machine output shaft.

It is an additional object of this invention to provide a brake assembly of the character described which includes an electromagnetic brake that can develop high braking torque with very low electrical power input.

These and other objects and advantages of this invention will become more readily apparent from the following detailed description of a preferred embodiment thereof when taken in conjunction with the accompanying drawings, in which:

BRIEF DESCRIPTION OF THE DRAWINGS

FIG. 2 is an end view of the multiple disc brake assembly as seen from the right hand side of FIG. 1;

FIG. 3 is a sectional view of the disc assembly taken along line 3—3 of FIG. 2;

BEST MODE FOR CARRYING OUT THE INVENTION

Figure 1:
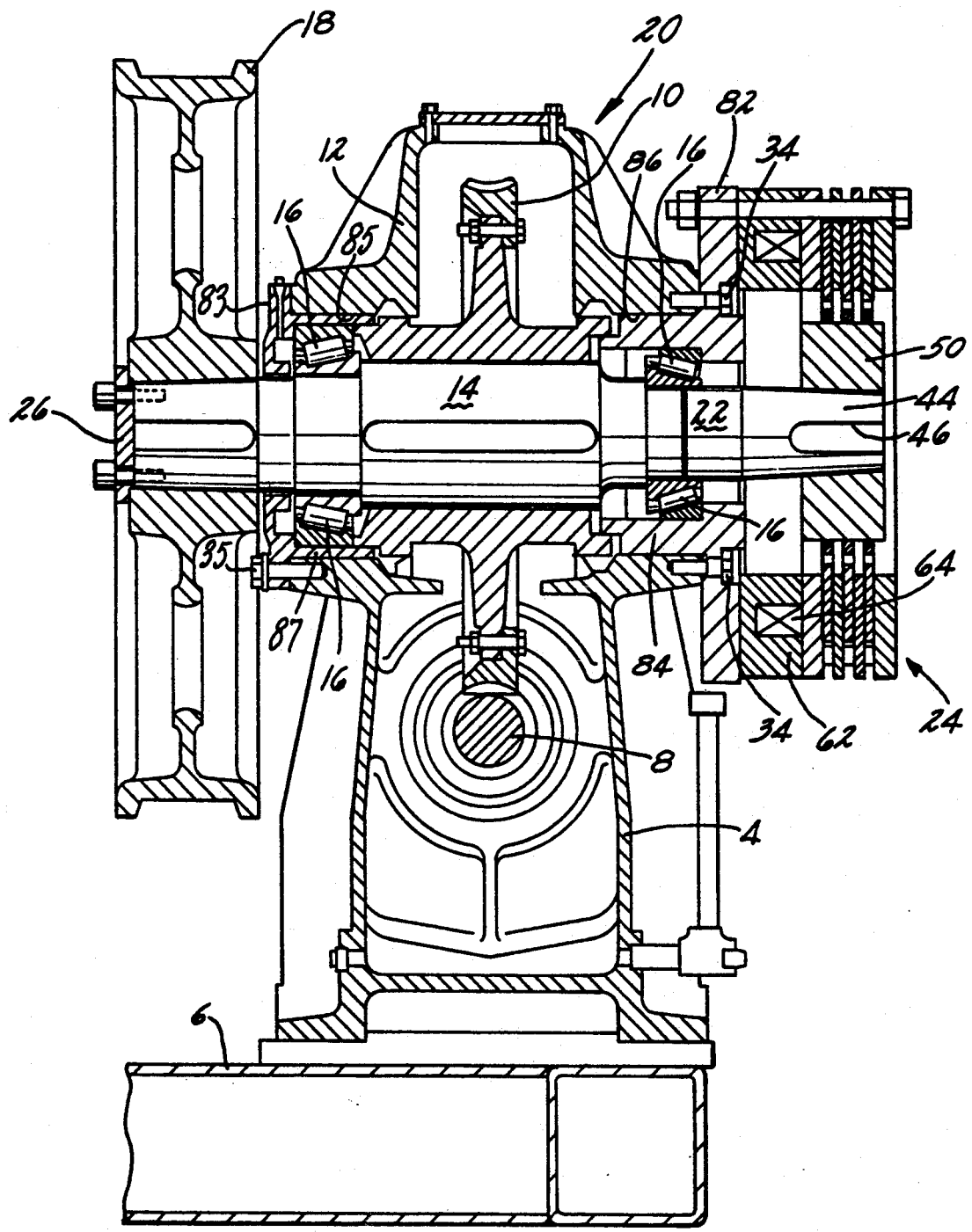
FIG. 1 is a cross-sectional view of a geared elevator machine having a preferred embodiment of a safety brake thereon which is formed in accordance with this invention.
Figure 4:
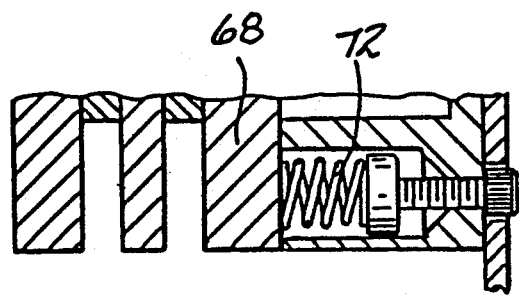
FIG. 4 is a fragmented sectional view of one of the brake actuating springs in the brake assembly.
Figure 5:
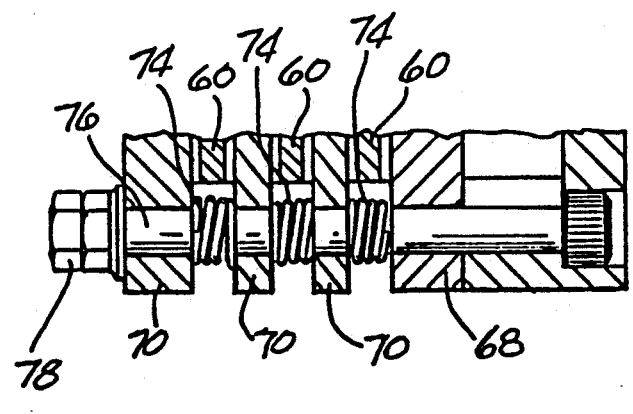
FIG. 5 is a fragmented sectional view of one of the brake plate adjustment bolts in the brake assembly.

Referring now to FIG. 1, there is shown a preferred embodiment of a multiple disc emergency brake mounted on a conventional geared elevator drive machine. The machine is denoted generally by the numeral 20 and includes a lower casing 4 which is mounted on a bedplate 6 in the machine room of the building housing the elevator. The lower casing 4 houses a worm gear 8 which meshes with a ring gear 10 mounted in an upper casing 12 of the machine 2. It will be understood that the worm gear 8 is driven by an electric motor (not shown) and in turn drives the output shaft gear 10. The output shaft gear 10 is mounted directly to the output shaft 14 or to a spyder which is journaled in bearings 16 in the upper casing 12. The elevator drive sheave 18 is mounted on and keyed to the output shaft 14. The cover plate 26 is mounted on an end of the output shaft 14 to hold the sheave 18 in place on the shaft 14. The components described to this point constitute the conventional general components of a geared elevator drive assembly.

An output shaft extension 22 is formed on the output shaft 14 to form a rotating extension thereof. A multiple disc brake assembly denoted generally by the numeral 24 is mounted on a tapered nose portion 44 of the output shaft extension 22. A key slot 46 is formed in the nose 44 for keying a part of the brake assembly to the extension 22, as will be explained in greater detail hereinafter.

Referring now to FIGS. 1-3, details of the brake assembly 24 are shown. As seen in FIG. 1, the brake assembly 24 includes a base plate 82 which is bolted to the machine housing 4, 12 by bolts 34. The plate 82 has a boss 84 telescoped into a counterbore 86 in the housing 4, 12. A closure plate 83 having a boss 85 extending into counterbore 87 closes the other end of the casing 4, 12. The plate 83 is bolted to the casing 4, 12 by bolts 35. The counterbores 86 and 87 and bosses 84 and 85 are eccentric with respect to the axis of rotation of the output shaft 14 thereby allowing both backlash adjustment of the gear mesh if both the eccentric covers 82 and 83 are rotated equally and in the same direction, or horizontal shifting of the contact pattern of the gear teeth if the covers are rotated in opposite directions, to correct for numerous possible minor machining errors. The process of mounting worm gear or helical gear output shafts on eccentric covers to correct gear mesh patterns is well known to those skilled in the art. Excessive backlash creates car leveling problems, whereas insufficient backlash can jamb the mesh due to thermal expansion of the gears while running.

The first problem that this invention solves is how to allow for moving the geometric position of the output shaft relative to the input shaft while keeping the brake concentric to the output shaft, regardless of its gear mesh adjustment setting. As most clearly shown in FIGS. 2 and 3, the brake assembly 24 includes a central hub 50 which has a through tapered passage 52 with a key slot 54. The hub 50 is fitted onto the extension nose 44 and keyed thereto for rotation therewith. The outer circumferential surface of the hub 50 is formed with splines 56 so as to be fitted with a plurality of internally splined friction discs 58 of a suitable number, depending on the amount of braking torque which is required in each application. Each of the discs 58 carries an annular radially outwardly extending friction pad 60. It will be appreciated from the above, that the hub 50, discs 58 and pads 60 all rotate with the output shaft 14 and sheave 18.

The second problem that this invention solves is how to provide a highly accurate and flat surface for the brake torque to react against, without the need to extensively machine, modify, or redesign the gearbox housing (casting). The plate 82 can also be applied to a fixed center gearbox, which does not require any eccentric adjustment due to smaller center distances or highly accurate machining of the gears and gearbox housing 4. Some newer design elevator machines under development by Otis are of the fixed center distance type, relying on gear alignment solely on the basis of highly accurate machining of the gearbox parts. In this case the side wall of the gearbox housing is not satisfactory for bolting on the disc brake assembly because of its irregular shape and dimensional inaccuracies. The illustrated mounting technique minimizes machining of the gearbox by use of the machined plate 82 and mounting bolts 34. In this way the need to provide a flat machined surface on the side of the gearbox housing 4 is minimized.

The brake assembly 24 also includes a magnet assembly 62 having a coil 64, and which is mounted on the base plate 82 (See FIG. 1). An armature plate 68 is disposed adjacent to the magnet assembly 62, followed by a series of annular brake plates 70. It will be noted that the friction discs 60 and brake plates 70 are interleaved. The armature plate 68 is biased away from the magnet assembly 62 by a plurality of coil springs 72, and the brake plates 70 are biased apart by a plurality of light coil springs 74 mounted on bolts 76 which extend through the armature plate 68 and the brake plates 70. The brake plates 70 are thus held away from the interleaving friction discs 60 by the coil springs 74 when the brake assembly is "off". Nuts 78 are threaded onto the ends of the bolts 76 to allow for adjustment of the spacing between the plates 70 to account for wear on the brake during its useful life. A plurality of guide dowels 80 dispersed circumferentially about the brake assembly 24 extend through the magnet assembly 62, and the armature plate 68 and brake plates 70 to guide axial movement of these components relative to each other when the brake is set and released. It will be appreciated from the above that the discs 60 rotate with the output shaft 14 and sheave 18, while the plates 70 remain relatively stationary.

The emergency brake assembly described above operates as follows. During normal safe operation of the elevator the coil 64 is energized, and the armature plate 68 is magnetically held against the magnet assembly 62 causing the actuating springs 72 to be compressed. The brake assembly 24 is thus in a "release" mode, and the friction discs 60 will be free to rotate with the extension 22, uninhibited by the plates 70. In the event of an unsafe operating episode, such as overspeed in either direction, or door-open movement of the cab away from a landing, power to the coil 64 will be switched off, and the coil 64 will deenergize. The actuating springs 72 will then move the armature plate 68 away from the magnet assembly 62 and toward the annular brake plates 70. The force of the springs 72 is such that the spacer springs 74 will be compressed and the plates 70 will clamp the discs 60 against further movement. Movement of the output shaft 14 and sheave 18 will thus be interrupted and the cab will stop its movement in the hoistway. At the same time, power to the machine will be interrupted. After the cause of the unsafe cab movement has been discovered, the brake assembly 24 can be released merely by restoring power to the coil 64. It should be noted that this device precludes any chance of a greater than 1 g stop, as opposed to an up direction safety mounted to the car, because traction will be lost on the drive sheave allowing a slide of the ropes and therefore always controlling maximum possible deceleration rates.

It will be readily appreciated that the brake assembly of this invention can be fitted onto a substantially conventional elevator machine, and can be easily connected to the elevator controller and the governor cable system so as to be selectively actuated when the controller senses door-open cab movement away from a landing, or when the governor cable experiences excessively high speed movement in either direction. The brake assembly of this invention can generate high torque braking forces without damaging components of the elevator drive, and can be operated with a very small current power supply. While the brake assembly has been described herein as an emergency safety brake, it will be readily appreciated that it could also be used as the normal cab holding brake when the cab is stopped at landings to allow normal passenger traffic between the cab and landings. Likewise, it will be readily apparent that the brake assembly's utility is not limited to geared elevator machines, but can also be used in conjunction with a gearless elevator system.

Since many changes and variations of the preferred embodiment of this invention may be made without departing from the inventive concept, it is not intended to limit the invention otherwise than as required by the appended claims.

What is claimed is:

1. In combination with an elevator drive system which includes a drive machine having a rotatable output shaft mounted in a casing, a sheave mounted on said output shaft and rotatable therewith, and a plurality of hoist cables reeved over the sheave, and wherein the drive machine casing is fixed to a bedplate, a brake assembly comprising:
   a) friction disc means operably connected to and rotatable with said output shaft and sheave;
   b) brake plate means connected to said casing and fixed against rotation thereon, said friction disc means being interposed between components of said brake plate means;
   c) actuating means for selectively causing said brake plate means to clamp said friction disc means against rotation thereby selectively stopping rotation of said output shaft and sheave; and
   d) said output shaft including a generally cylindrical extension formed integrally with one end thereof, said extension protruding form said casing, and said friction disc means being mounted on said extension.

2. The combination of claim 1 wherein said brake plate means are secured to a plate which is bolted to said machine casing.

3. The combination of claim 2 wherein said plate includes a circular boss which extends into a counterbore in said casing which counterbore surrounds said output shaft.

4. The combination of claim 3 wherein said output shaft is concentric with and journaled in a bore in said boss.

5. The combination of claim 4 wherein said boss and said counterbore are eccentric relative to each other.

6. The combination of claim 1 wherein said output shaft extension is on the end of said output shaft distal of said sheave.

* * * * *